United States Patent
Furutani

[11] Patent Number: 5,495,906
[45] Date of Patent: Mar. 5, 1996

[54] CONTROLLER OF HYBRID ELECTRIC VEHICLE

[75] Inventor: Masayuki Furutani, Susono, Japan

[73] Assignee: Toyota Jidosha Kabushiki Kaisha, Toyota, Japan

[21] Appl. No.: 185,407

[22] Filed: Jan. 24, 1994

[30] Foreign Application Priority Data

Jan. 25, 1993 [JP] Japan .......................................... 5-9972

[51] Int. Cl.⁶ ...................................................... B60L 11/02
[52] U.S. Cl. .......................... 180/65.2; 180/65.4; 180/242
[58] Field of Search ..................... 180/65.4, 242, 180/243, 65.1, 65.2, 65.3, 65.8, 69.6; 364/424.01, 424.05; 60/719

[56] References Cited

U.S. PATENT DOCUMENTS

| 4,923,025 | 5/1990 | Ellers | 180/65.2 |
| 5,176,213 | 1/1993 | Kawai | 180/65.4 |
| 5,301,764 | 4/1994 | Gardne | 180/65.2 |
| 5,327,987 | 7/1994 | Abdelmalek | 180/65.4 |

FOREIGN PATENT DOCUMENTS

| 48-64626 | 9/1973 | Japan . | |
| 49-6619 | 1/1974 | Japan . | |
| 50-21210 | 3/1975 | Japan . | |
| 0232027 | 9/1988 | Japan | 180/242 |

Primary Examiner—Anne Marie Boehler
Attorney, Agent, or Firm—Oblon, Spivak, McClelland, Maier & Neustadt

[57] ABSTRACT

A motor continuously drives rear wheels during medium and low-speed running, while an engine drives front wheels in a high-speed running area. In this case, transfer of an engine-generated driving force to wheels is controlled by a transmission. In a medium- or low-speed running area, the engine is used only for power generation and engine-driven running is not carried out.

7 Claims, 3 Drawing Sheets

OVERALL CONSTITUTION OF EMBODIMENT

CONTROLLER OF HYBRID ELECTRIC VEHICLE

BACKGROUND OF THE INVENTION (i) Field of the Invention

The present invention relates to a controller of a hybrid electric vehicle having an engine-driven power generator.

(ii) Description of the Prior Art

An electric vehicle has become prominent in view of low pollution in recent years. However, because it is essential for the electric vehicle to have a battery as its energy source and the battery has a considerable volume and weight, it is impossible to greatly increase the battery capacity. Therefore, a hybrid electric vehicle having an engine-driven power generator is proposed to charge the battery. The hybrid electric vehicle operates the engine-driven power generator when the battery charge quantity decreases in order to recover the battery charge state. Therefore, it is possible to increase the running distance per unit charge without greatly increasing the battery capacity. Moreover, engine driving for power generation can be carried out with a small exhaust quantity of pollutant because load fluctuation of the engine driving for power generation is smaller than that of engine driving for running. This type of hybrid electric vehicle is disclosed in the official gazette of, for example, Japanese Patent Laid-Open No. 21210/1975.

For an existing hybrid electric vehicle, however, it is necessary to increase the electric power quantity generated by an engine so as to correspond to the discharge quantity at this time in order to prevent a battery from deteriorating due to over discharge during high-speed running. Therefore, the existing hybrid electric vehicle has a problem that the engine and power generator are increased in size and weight and it is difficult to mount them in a vehicle.

As the hybrid electric vehicle, a series hybrid electric vehicle using its engine only to drive its power generator is generally used. However, a parallel hybrid electric vehicle capable of using the driving force generated by the engine to run the vehicle is also known. The parallel hybrid electric vehicle makes it possible to achieve running at a high energy efficiency. However, the parallel hybrid electric vehicle has a problem that the exhaust quantity of pollutant increases because the engine load fluctuates.

SUMMARY OF THE INVENTION

The present invention is made to solve the above problem and its object is to provide a controller of a hybrid electric vehicle capable of downsizing a power generator while keeping the exhaust quantity of pollutant at a low level.

The present invention is a controller of a hybrid electric vehicle having an engine and motor for controlling the engine and motor, comprising:

a battery for supplying electric power to the motor;

motor-generated driving-force transfer means for transferring the driving force generated by the motor to wheels;

a power generator driven by the engine to supply generated electric power to the battery;

engine-generated driving-force transfer means for transferring the driving force generated by the engine to wheels;

running state detection means for detecting a running state of a vehicle; and control means for controlling whether to transfer the driving force generated by the engine to the generator according to the detected vehicle running state.

Therefore, a vehicle runs by driving wheels with a motor in a vehicle running state such as a low- or medium-speed running area in which the vehicle speed is comparatively low. That is, the vehicle operates as a series hybrid electric vehicle which prevents the engine from driving wheels and carries out only power generation control and battery charge by the engine. In a high-speed running area, however, the vehicle operates as a parallel hybrid electric vehicle which drives wheels with the motor and transfers the engine-generated driving force to wheels to replenish a required driving force. Therefore, in the low- or medium-speed running area, it is possible to decrease the quantity of unburned exhaust gas, replenish electric power with the engine-driven power generator, and increase the running distance. Moreover, it is not necessary to increase the quantity of electric power to be generated in order to obtain a driving force for high-speed running by increasing the size of the power generator. Therefore, it is possible to downsize the power generator so that the generator can easily be mounted in the vehicle and decrease the weight of the vehicle.

It is preferable that the motor-generated driving-force transfer means transfers the driving force to either of front or rear wheels and the engine-generated driving-force transfer means transfers the driving force to either of the front or rear wheels to which no engine-generated driving force is transferred. Therefore, a driving mechanism can be simplified.

The control means sets a period for transferring the driving forces generated by both the engine and motor to wheels when the vehicle speed changes from a value equal to or less than a predetermined value to a value larger than the predetermined value. Thereby, it is possible to lighten a shock at the time of a vehicle speed change.

It is preferable that the running state detection means detects vehicle speed and vehicle load.

In this case, it is preferable that the control means transfers the driving force generated by the engine to the power generator and changes the electric power generated by the power generator in accordance with the vehicle load if the vehicle speed is the predetermined value or less. Moreover, it is preferable to change the predetermined value of the vehicle speed in accordance with the vehicle load. This realizes more preferable control in accordance with the motor output torque.

DESCRIPTION OF THE PREFERRED EMBODIMENTS

Embodiments of the present invention will be described below with reference to drawings.

Figure 1:
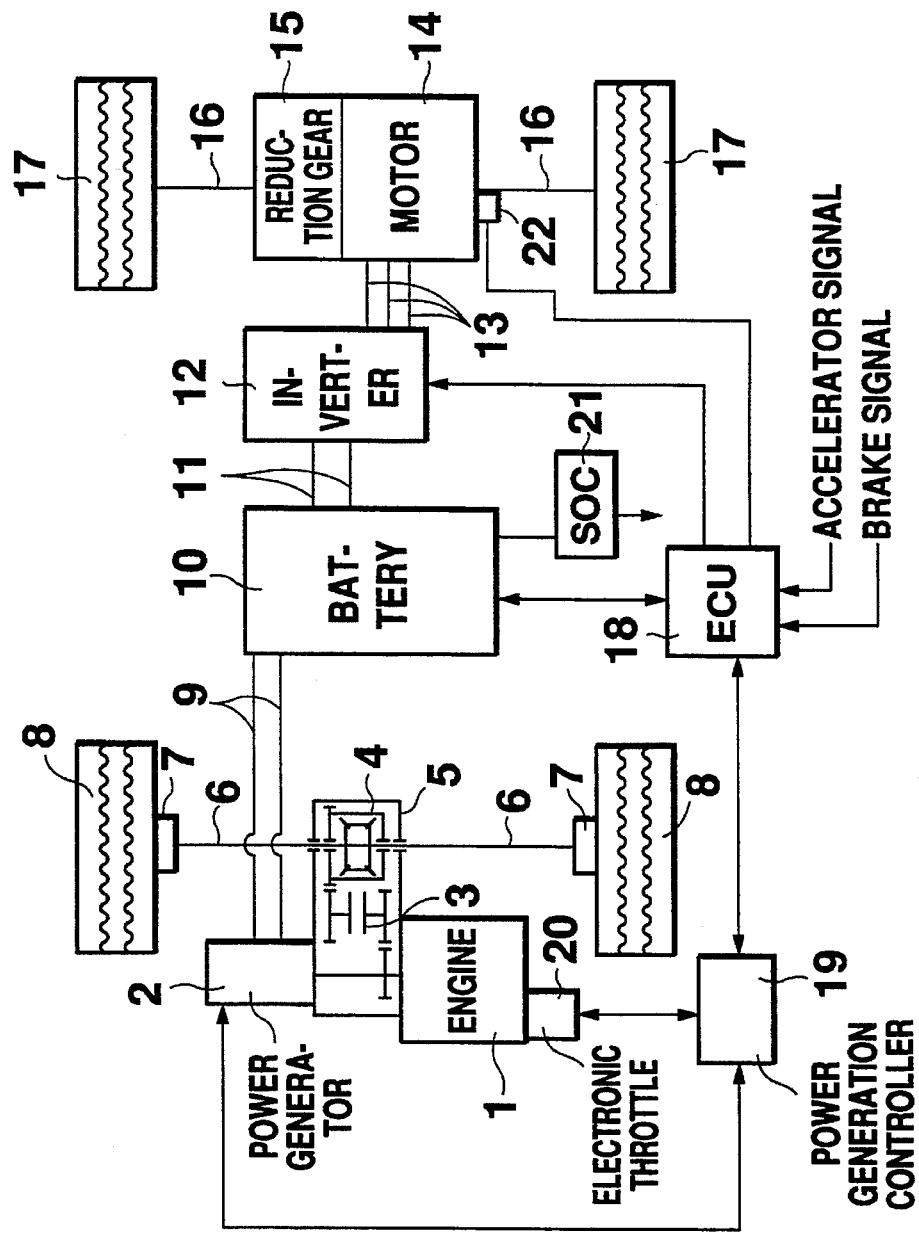
FIG. 1 is a block diagram showing the overall constitution of an embodiment of the present invention.

In FIG. 1, an engine 1 is a motor for generating motive power which is connected to a power generator 2. Therefore, the power generator 2 generates DC power by using the driving force generated by the engine 1. The engine 1 is also connected to a transmission 5 including a clutch 3 and differential gear 4. The transmission 5 transfers the driving force generated by the engine 1 to a drive shaft 6 through the differential gear 4 when it connects with the clutch 3. The drive shaft 6 is connected to a pair of front-wheel tires and rotation of the drive shaft 6 is transferred to the front-wheel tires 8.

A power cable 9 electrically connects the power generator 2 and battery 10 and supplies generated electric power to the battery 10. The battery 10 is electrically connected with an inverter 12 comprising a plurality of switching transistors by a power cable 11 and the inverter 12 is connected to an AC induction motor 14 by a power cable 13. Therefore, DC power sent from the battery 10 is converted into a desired AC current by the inverter 12 and the desired AC current is supplied to the motor 14 to drive the motor 14. The motor 14 is connected to a pair of rear-wheel tires 17 through a reduction gear 15 and a drive shaft 16, and therefore the driving force generated by the motor 14 is transferred to the rear-wheel tires 17.

This embodiment is constituted so that the front wheels 8 are driven by the engine 1 and the rear wheels 17 are driven by the motor 14. However, it is also possible to constitute the embodiment so that the rear wheels 17 are driven by the engine 1 and the front wheels 8 are driven by the motor 14.

An ECU 18 controls operations of the inverter by using accelerator and brake signals as inputs for accelerator and brake applying levels. That is, the ECU 18 calculates an output torque command value of the motor 14 and controls switching of the switching transistors of the inverter 12 in accordance with the output torque command value to control the output torque of the motor 14.

An SOC meter 21 for detecting a state of charge (SOC) of the battery 18 is connected to the ECU 18 to which a signal for the state of charge of the battery 10 is supplied. Moreover, the ECU 18 sends control signals for start and stop of power generation to a power generation controller 19 in accordance with the state of charge of the battery 10. The power generation controller 19 controls an electronic throttle 20 of the engine 1 and carries out field control for and power generation of the generator 2. Moreover, a signal for vehicle speed sent from a vehicle sensor 22 for detecting vehicle speed sent from the wheel speed is sent to the ECU 18.

An auxiliary battery is connected to the battery 10 through a DC—DC converter (not illustrated) so that the auxiliary battery is supplied with electric power. The auxiliary battery supplies electric power for turning on a lamp or driving a starter motor of the engine. The DC—DC converter is also used to drop a high voltage (e.g. 200 V) of the battery 10 to a low voltage (e.g. 12 V).

Figure 2A:
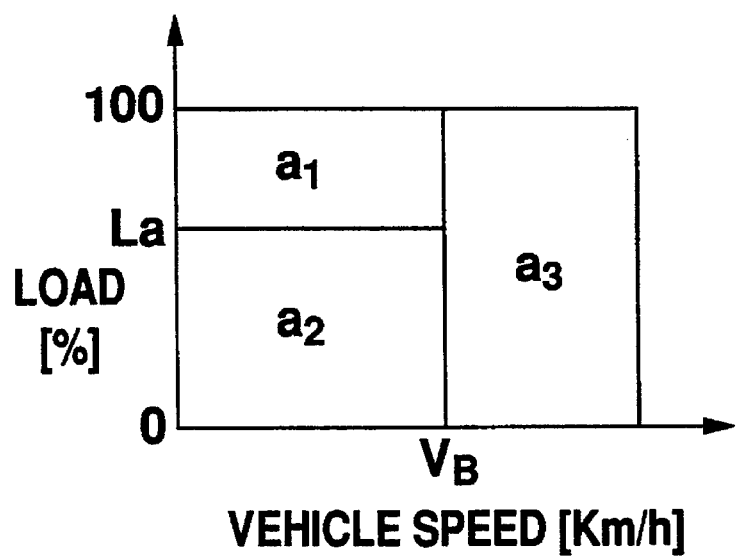
FIGS. 2A and 2B are illustrations showing examples of output classification of load to vehicle speed in an embodiment of the present invention.
Figure 2B:
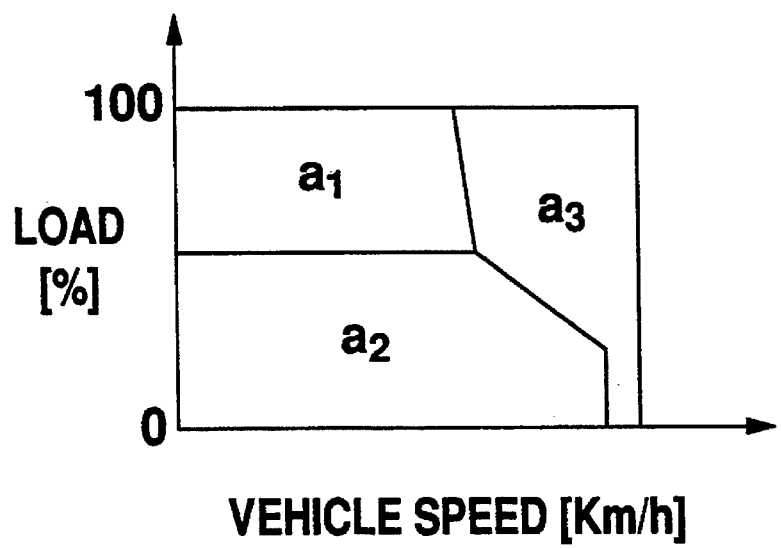

FIGS. 2A and 2B show output classification of the system shown in FIG. 1, in which the axis of ordinates shows vehicle speed and the axis of abscissas shows vehicle load. Vehicle speed is detected with output torque obtained from an accelerator applying level, torque command value, or electric power supplied to the motor 14.

In FIG. 2A, an area $a_1$ is a medium- or low-speed area in which vehicle speed is comparatively low (equal to or less than $V_B$) and vehicle load is comparatively large (equal to or larger than a predetermined value La). In the area $a_1$, the engine 1 generates electric power by driving the power generator 2 and also increases the output of the power generator 2. Also in this area, a vehicle runs only by the output of the motor 14.

An area $a_2$ is a medium- or low-speed area in which vehicle speed is comparatively low (equal to or less than $V_B$) and vehicle load is comparatively small (equal to or less than the predetermined value La). In the area $a_2$, the engine 1 drives the power generator 2 and also decreases the output of the power generator 2. In this area also, the vehicle runs only by the output of the motor 14.

Therefore, this embodiment only uses the engine 1 to drive the power generator 2 but does not use it to drive the vehicle in the medium- or low-speed area in which vehicle speed is $V_B$ or less. Therefore, the engine 1 is able to carry out constant-speed constant-load operation corresponding to a predetermined quantity of electric power to be generated by the power generator 2. Thus, it is possible to minimize the quantity of toxic matter in the exhaust gas of the engine 1. When the vehicle is driven by the engine 1 in this area, there is a greater possibility that toxic matter will be contained in emission matter. That is, it is generally known that a large amount of toxic matter (particularly, unburned matter) is contained in exhaust gas when a normal gasoline-powered vehicle starts.

Outputs of the power generator 2 are changed in accordance with vehicle load. For a small vehicle load, over charge of the battery 10 due to excessive power generation can be prevented by decreasing the quantity of electric power to be generated because the motor 14 consumes less current. For a large vehicle load, it is possible to prevent the charge state of the battery 10 from being impaired by generating electric power corresponding to the vehicle load, because the motor 14 consumes more current.

An area $a_3$ is a high-speed area in which vehicle speed is $V_B$ or more. In this area, the output of the power generator 2 is stopped and the clutch 3 is connected to transfer the driving force generated by the engine 1 to the front wheels 8. In the area $a_3$, the vehicle basically runs by the output of the engine 1. In this high-speed area, engine speed is equal to or higher than a predetermined value and toxic matter contained in exhaust gas can be greatly decreased. When the motor 14 is driven in this area, it consumes a very large amount of current and the charge state of the battery 10 is impaired. If the quantity of electric power to be generated is increased to compensate for the impaired charge state, a larger power generator is necessary. This embodiment is free from the above disadvantage.

In this case, it is also preferable that the classification into the three areas is made as shown in FIG. 2B. In FIG. 2B, an area in which an engine is not driven is increased in a small load area even for a high speed. This is because power consumption of the motor 14 decreases as load decreases even for the same vehicle speed. Therefore, a more preferable change control can be carried out in accordance with the classification in FIG. 2B.

Figure 3:
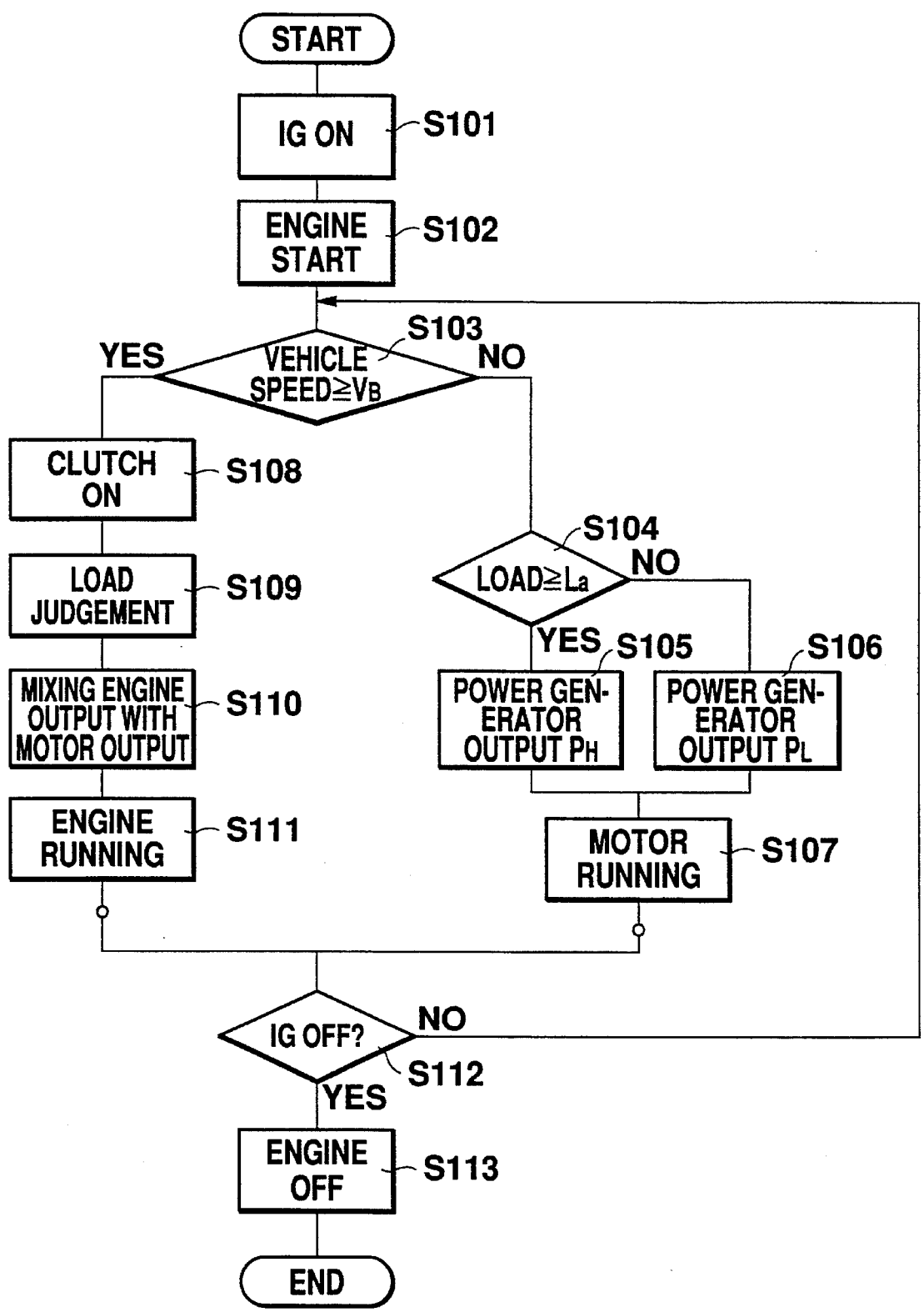
FIG. 3 is a flow chart of the operation of an embodiment of the present invention.

Operations in the case of the area pattern in FIG. 2A will be described below in reference to the flow chart in FIG. 3.

The system starts when a vehicle starts running due to IG ON (ignition key ON: S101). Then, the ECU 18 first starts the engine 1 through the power generation controller 19 to start power generation with the power generator 2 (S102). Then, the driving force generated by the engine 1 is transferred only to the power generator 2 to generate electric power as the initial state. In this case, the power generation controller 19 controls fields in the electronic throttle 20 and the power generator and also controls power generation by the engine so that a predetermined electric power is generated (S102). Then, the controller judges whether vehicle speed is kept at a level $V_B$ (e.g. 80 Km/h) or less (S103). When the vehicle speed is $V_B$ or less, the engine 1 starts quasi-stationary operation for power generation. That is, the controller detects vehicle load from output torque of the motor 14 or the like to judge whether the vehicle load is a predetermined value La or more (S104). When the vehicle load is La or more, the controller sets the output of the power generator 2 to a predetermined high level PH (S105). If the vehicle load is less than the predetermined value, the controller sets the output to a predetermined low level PL. In this case, it is assumed that PH equals 10 kw and PL equals 4 kw. Under this state, the controller keeps the clutch 3 released and runs the vehicle with the driving force generated by the motor 14 (S107).

On the other hand, when vehicle speed is $V_B$ or more in S103, stationary operation is started and the clutch 3 is connected (S108). In this case, power generation by the driving force generated by the engine 1 stops. Then, the controller judges vehicle load with the accelerator applying level and vehicle speed (S109), decreases the output of the motor 14 while keeping a condition where the total output of the engine 1 and motor 14 is balanced with vehicle load, and controls mixing of the engine output with the motor output (S110). In this case, the controller slowly carries out the control to lighten the shock. The controller finally turns off the output of the motor 14 to carry out running by the engine 1 (S111). The output of the engine 1 is improved by changing the number of cylinders or increasing the rotational speed through control of the electronic throttle 20.

Then, the controller judges (S112) whether the ignition key is turned off during the running by the motor (S107) or the running by the engine (S111). If the key is not turned off, the controller restarts S103 to continue the control. When the ignition key is turned off, the controller turns off the engine 1 (S113) to end the control.

As described above, power generation by the power generator 2 is not carried out in the case of stationary operation. In this case, it is possible to mechanically separate the power generator 2 from the engine 1 or prevent electric power from being outputted from the power generator 2. Moreover, when the running by the engine is changed to the running by the motor, it is possible to carry out mixing of the driving force of the engine with that of the motor, similarly to S110.

To carry the control based on FIG. 2B, it is necessary to store the classification in FIG. 2B as a map and judge in which area the current vehicle speed and vehicle load are situated.

Thus, according to this embodiment, a vehicle is run by driving an engine in a high-speed running area. Therefore, it is sufficient to use a power generator with a power generation capacity corresponding to a medium- or low-speed area in which power consumption is comparatively small and an engine and power generator can be downsized. Moreover, because the engine 1 is used only with a large load side (high-speed running area) having a preferable torque characteristic, a transmission is unnecessary, and the constitution of a torque transfer system can be simplified. Accordingly, a power generator can be downsized. Moreover, the exhaust quantity of pollutant can be minimized because load fluctuation of the engine 1 is comparatively small.

Though electric power is not basically generated during running by the engine for the above embodiment, it is possible to operate the power generator 2 depending on the charge state of the battery 10 detected by the SOC meter 21. For the above embodiment, the engine 1 is continuously driven during running. However, it is also possible to stop driving the engine 1 depending on the charge state of the battery 10.

Moreover, it is possible to carry out regenerative braking by using the motor 14 while running through driving of the engine 1. That is, a braking force can be generated by operating the motor 14 as a power generator when decelerating a vehicle by operating a brake. In this case, it is preferable to use generated electric power for charge of the battery 10.

What is claimed is:

1. A controller of a hybrid electric vehicle having an engine and a motor for controlling driving of the engine and the motor, comprising:

a battery for supplying electric power to the motor;

motor-generated driving-force transfer means for transferring the driving force generated by the motor to wheels;

a power generator driven by the engine to supply generated electric power to the battery;

engine-generated driving-force transfer means for transferring the driving force generated by the engine to wheels;

running state detection means for detecting a vehicle running state; and control means for controlling whether to transfer a driving force generated by an engine to a generator or wheels in accordance with a detected vehicle running state, wherein the control means transfers the driving force generated by the engine when said running state is a predetermined value or more, transfers the driving force generated by the motor to wheels when said running state is less than the predetermined value, and transfers the driving force generated by the engine to the power generator, and wherein the control means sets a period for transferring the driving forces generated by both the engine and motor to wheels when said running state changes from a value equal to or less than a predetermined value to a value larger than the predetermined value.

2. The controller of the hybrid electric vehicle according to claim 1 wherein the motor-generated driving-force transfer means transfers a driving force to any one of front and rear wheels and the engine-generated driving-force transfer means transfers a driving force to that one of front and rear wheels to which the motor-generated driving force is not transferred.

3. The controller of the hybrid electric vehicle according to claim 1 wherein the running state detection means detects vehicle speed.

4. The controller of the hybrid electric vehicle according to claim 1 wherein the running state detection means detects both vehicle speed and vehicle load.

5. The controller of the hybrid electric vehicle according to claim 4 wherein the control means transfers the driving force generated by the engine to the power generator when vehicle speed is the predetermined value or less and changes the quantity of electric power generated by the power generator in accordance with vehicle load.

6. The controller of the hybrid electric vehicle according to claim 5 wherein the control means transfers the driving force generated by the engine to wheels when vehicle speed is larger than the predetermined value, stops transfer of the driving force generated by the engine to the power generator, and also stops transfer of the driving force generated by the motor to wheels.

7. The controller of the hybrid electric vehicle according to claim 6 wherein the predetermined value of vehicle speed is changed in accordance with vehicle load.

* * * * *